No. 622,830. Patented Apr. 11, 1899.
J. & J. R. TEMPERLEY.
APPARATUS FOR RAISING, LOWERING, AND CONVEYING LOADS.
(Application filed May 21, 1898.)
(No Model.) 7 Sheets—Sheet 1.
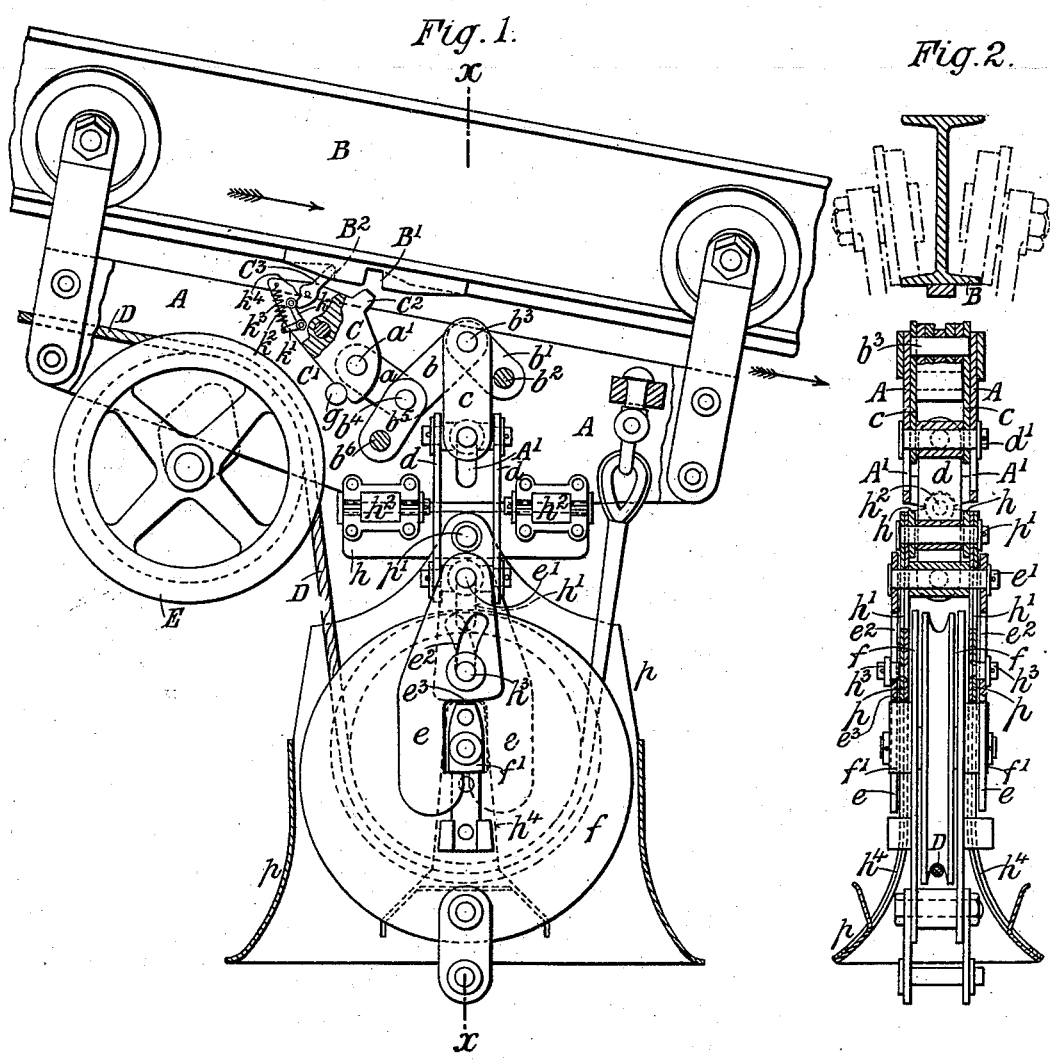

No. 622,830. Patented Apr. 11, 1899.
J. & J. R. TEMPERLEY.
APPARATUS FOR RAISING, LOWERING, AND CONVEYING LOADS.
(Application filed May 21, 1898.)
(No Model.) 7 Sheets—Sheet 2.

No. 622,830. Patented Apr. 11, 1899.
J. & J. R. TEMPERLEY.
APPARATUS FOR RAISING, LOWERING, AND CONVEYING LOADS.
(Application filed May 21, 1898.)
(No Model.) 7 Sheets—Sheet 3.
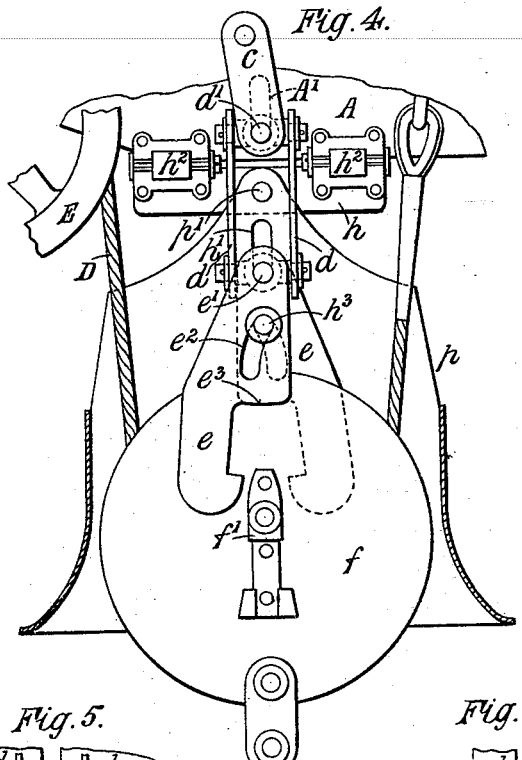
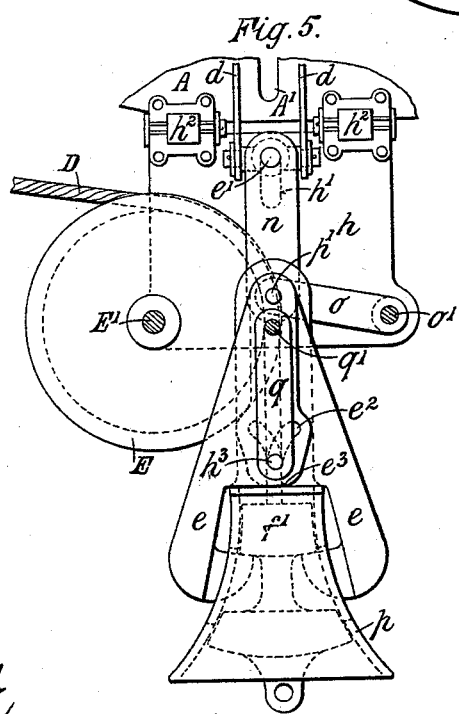
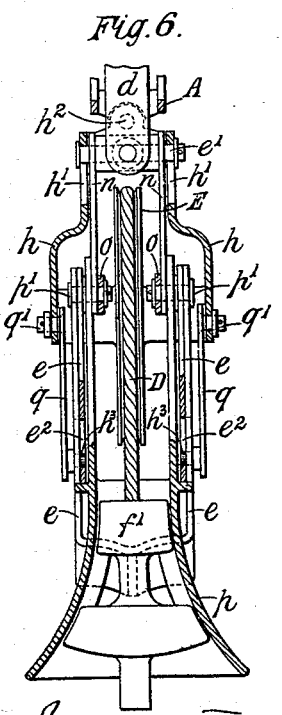

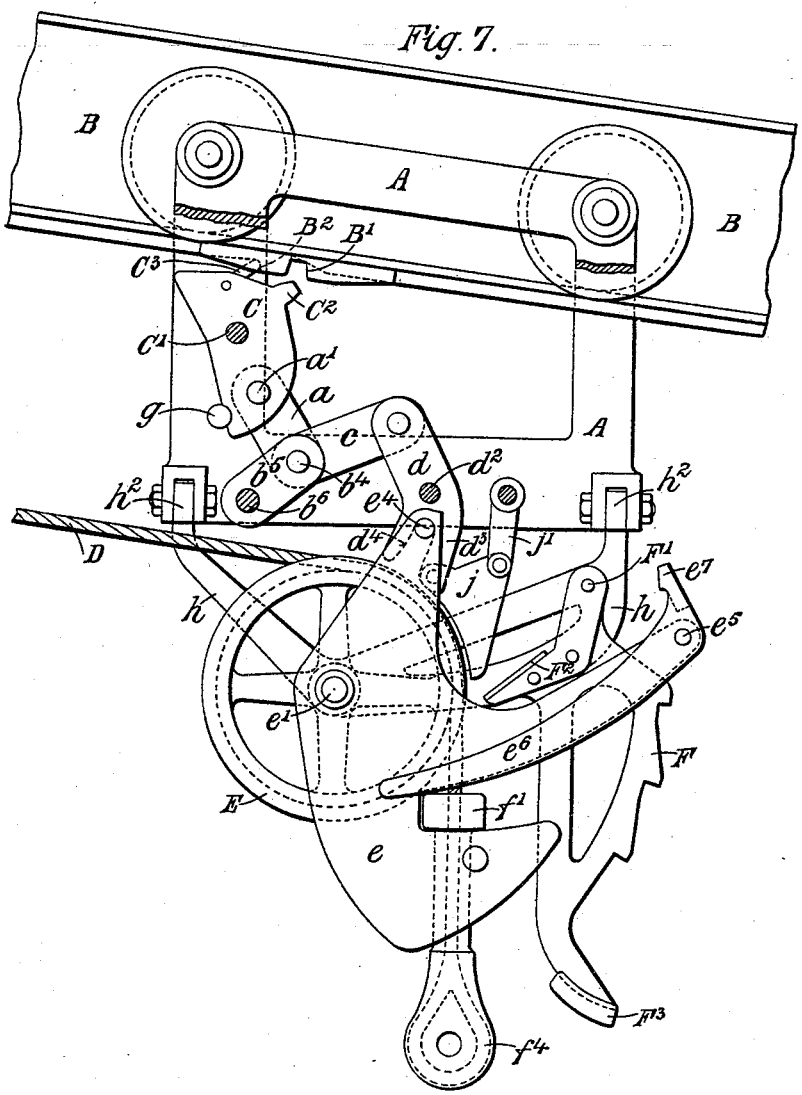

No. 622,830. Patented Apr. 11, 1899.
J. & J. R. TEMPERLEY.
APPARATUS FOR RAISING, LOWERING, AND CONVEYING LOADS.
(Application filed May 21, 1898.)
(No Model.) 7 Sheets—Sheet 5.

No. 622,830. Patented Apr. 11, 1899.
J. & J. R. TEMPERLEY.
APPARATUS FOR RAISING, LOWERING, AND CONVEYING LOADS.
(Application filed May 21, 1898.)
(No Model.) 7 Sheets—Sheet 7.

UNITED STATES PATENT OFFICE.

JOSEPH TEMPERLEY AND JOHN RIDLEY TEMPERLEY, OF LONDON, ENGLAND.

APPARATUS FOR RAISING, LOWERING, AND CONVEYING LOADS.

SPECIFICATION forming part of Letters Patent No. 622,830, dated April 11, 1899.

Application filed May 21, 1898. Serial No. 681,301. (No model.)

*To all whom it may concern:*

Be it known that we, JOSEPH TEMPERLEY and JOHN RIDLEY TEMPERLEY, engineers, subjects of the Queen of Great Britain, residing at London, England, have invented certain new and useful Improvements in Apparatus for Raising, Lowering, and Conveying or Transporting Loads, of which the following is a specification, reference being had to the accompanying drawings, in which—

Figure 3:
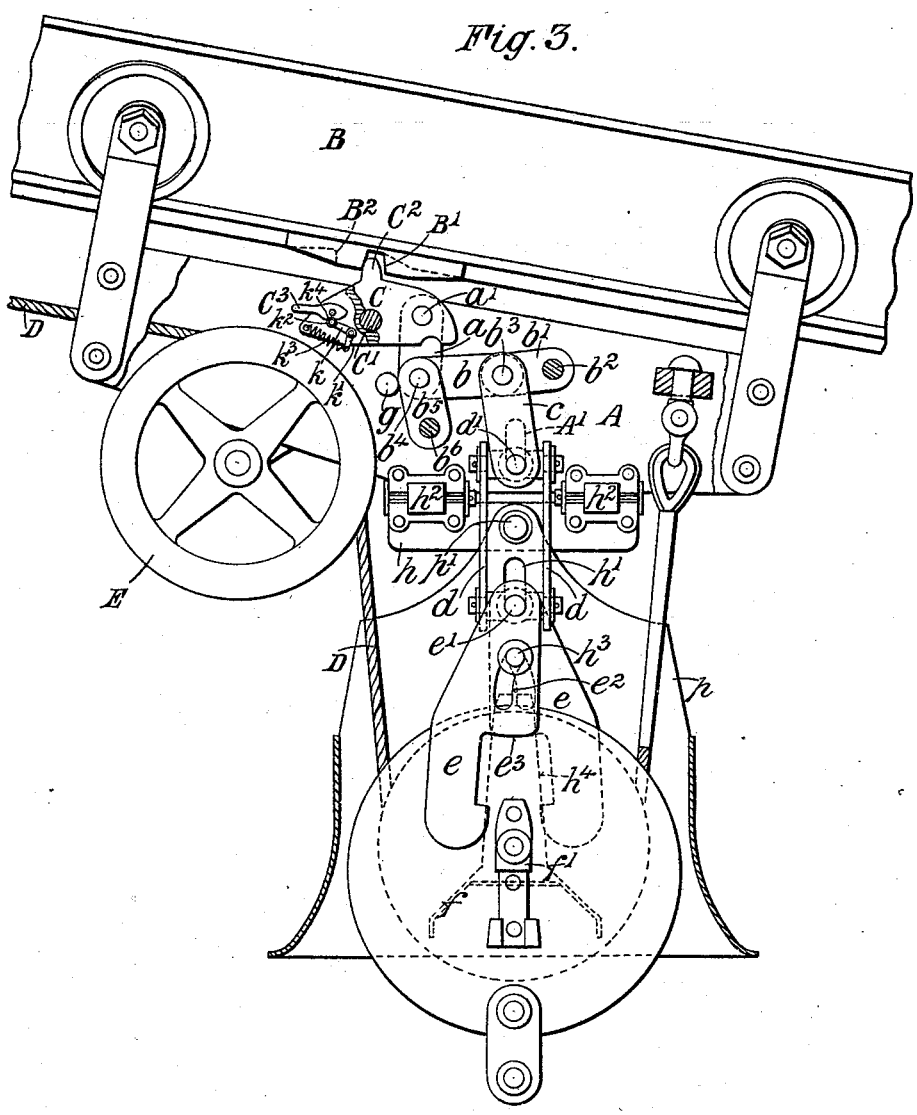
Figure 8:
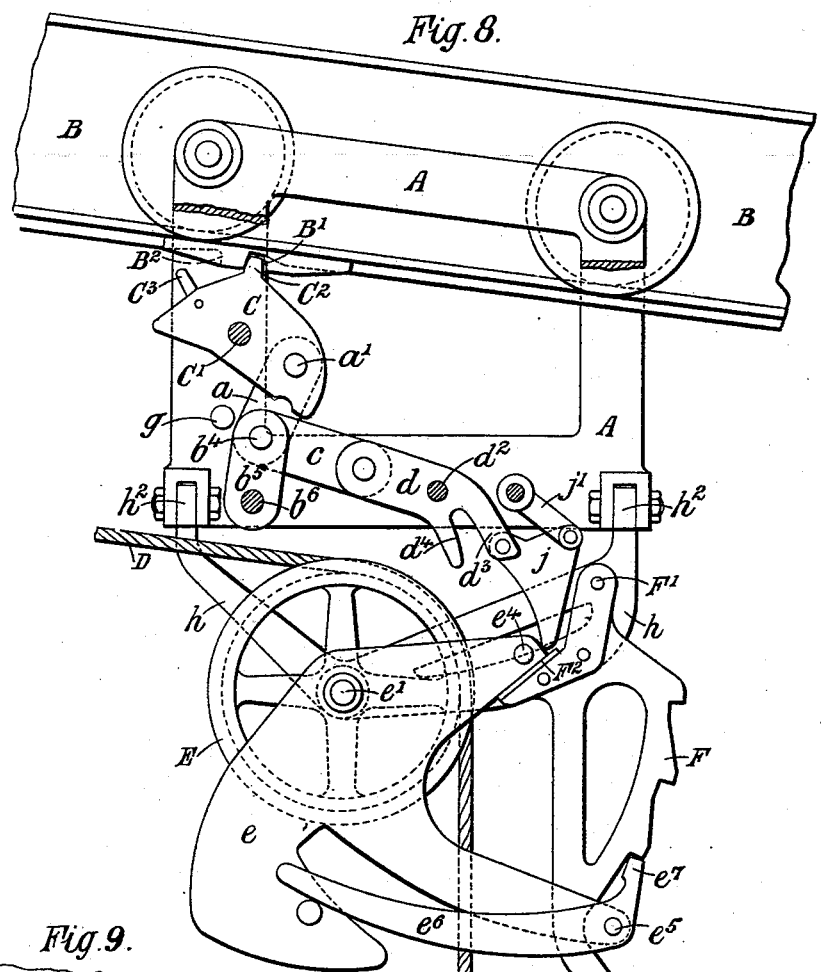
Figure 9:
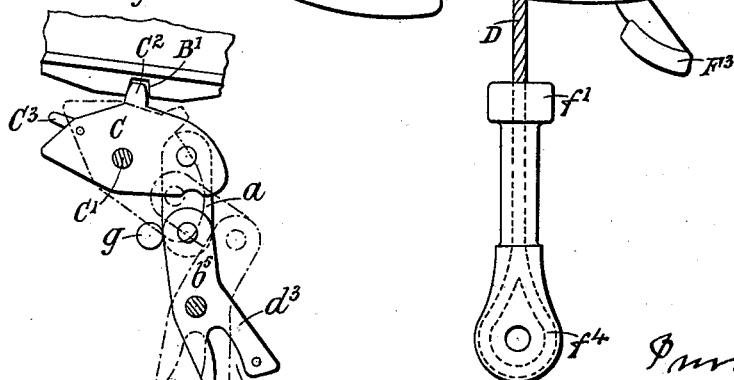
Figure 10:
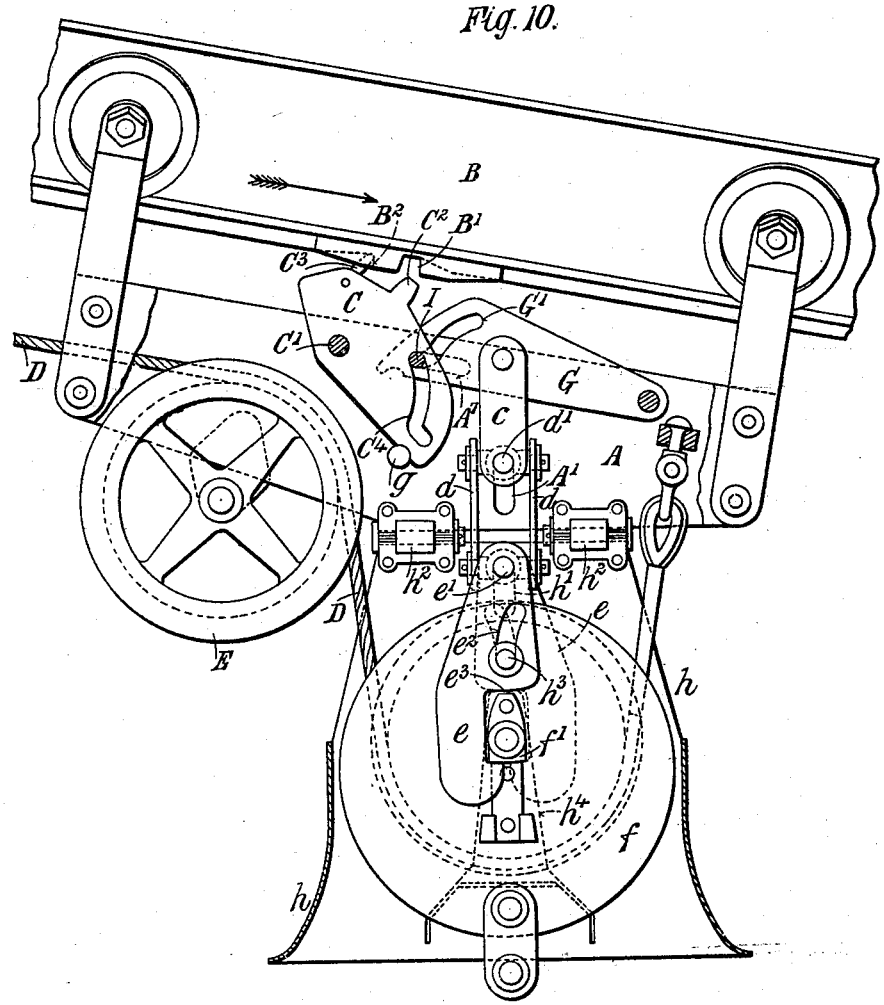
Figure 11:
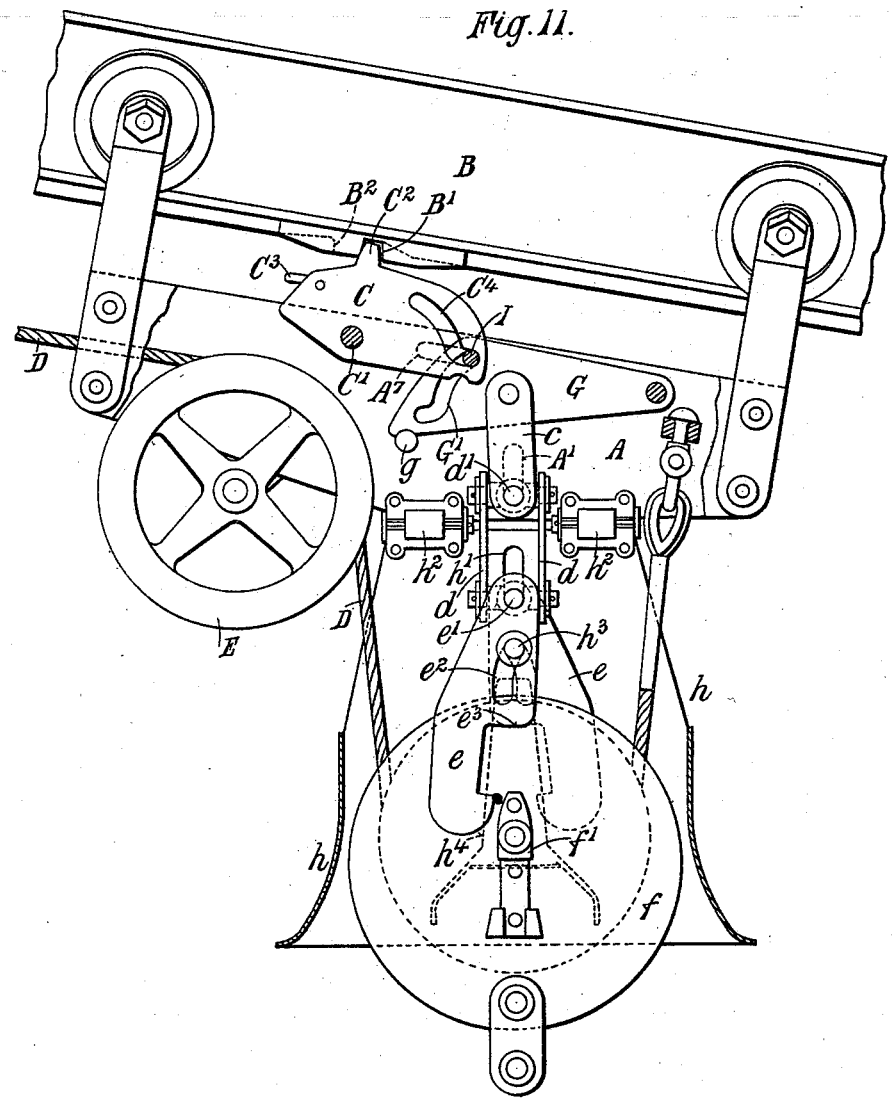

Figure 1 is a side elevation, partly in vertical section, of one form of our improved apparatus. Fig. 2 is a transverse section on the line $x\,x$, Fig. 1. Fig. 3 is a similar view to Fig. 1, the parts being shown in a different position. Fig. 4 is a sectional side elevation showing a modification of our invention in which the suspended guide-frame or bell is free to swing longitudinally and laterally. Fig. 5 is a sectional side elevation, and Fig. 6 an edge view, partly in transverse section, showing a similar arrangement applied to a single-purchase traveler. Fig. 7 is a side elevation illustrating another form or modification of our improved apparatus; and Fig. 8 is a similar view, the parts being shown in a different position. Fig. 9 shows in side elevation another modification of the apparatus illustrated in Figs. 7 and 8. Figs. 10 and 11 are views similar to Figs. 1 and 3, respectively illustrating a further modification of the apparatus shown in those figures.

Our invention relates to apparatus for raising, lowering, and conveying or transporting loads.

Our said invention is chiefly designed to improve the construction and increase the efficiency of apparatus of the kind or class described in the specification of former Letters Patent, dated August 29, 1893, No. 504,257, wherein a traveler is supported and runs upon an overhead track and is provided with automatic devices controlled by the lifting rope or chain, whereby when the load is raised the load-sustaining mechanism is locked, so that the load cannot be lowered during the movement of the traveler along the track, and whereby when the load is to be lowered the traveler is securely locked or held in position upon the track and the load-sustaining mechanism simultaneously unlocked.

One object of our present invention is to provide a system of levers and links which will fulfil the same functions as and will work as effectively or more effectively and with less friction and wear than the slotted cams, which in the apparatus described in the said former specification are employed in combination with the load-sustaining mechanism and with notches or stops on the track for locking the load-sustaining mechanism when the load is raised, so that the lifting-rope can then be used for hauling the traveler along the track and for releasing the said mechanism and at the same time locking the traveler to the track when the load is to be lowered.

Our system of levers and links comprises two locking toggle-joints, either of which will be straightened or pushed a short distance beyond the dead-center when the other is flexed and will thus be caused to lock the traveler to the track or the load-suspender in position to sustain the load, as the case may be, the straightening of one toggle-joint effecting the locking of the traveler and the other the locking of the load-suspender. The said system of levers and links is adapted for use in combination with notches or stops on the track, such as are described in the said former specification, and is capable of being used with the different forms of load-suspender hereinafter referred to and either with a single-purchase traveler, such as has heretofore been employed, or with a fall-block or double-purchase traveler, such as is hereinafter described.

In some instances we use as a load-suspender a forked or split lever-hook, as described in the said former specification. In other instances we provide a different form of load-suspender, which comprises two hooks depending from a common pivot-pin held in links, which in turn are suspended from a pin passed through one of the slotted cams or through links, as hereinafter described. The said load-suspending hooks are so constructed and arranged that when they are raised by the load-sustaining projections or blocks on the frame of the fall-block they will be caused to engage therewith and will be locked in this position until the lever or cam that engages with the track is released. These hooks are so arranged that in moving into engagement with the load-sustaining ball or block they will rise therewith. Consequently when the traveler is unlocked from the track the load will be sustained by the said hooks in the position to which it has been raised, and the load will not require to descend in order to permit the load-sustaining block to be engaged by the said hooks.

A guide-frame or bell depends from the frame of the traveler and serves to guide the load-sustaining ball or block into the load-suspender. The said guide-frame or bell is preferably suspended from the traveler-frame in such a manner that it can swing freely relatively thereto. We are enabled by these means to obviate the necessity for adjusting the parts to suit different inclinations of the track, the load-sustaining ball or block when the load is raised being in approximately the same position relatively to the load-suspender whatever may be the inclination of the track.

Our said invention, moreover, comprises other improvements hereinafter set forth.

A is the traveler, which runs upon an overhead beam or track B.

C is a lever pivoted at $C'$ to the traveler-frame A and having a projection or horn $C^2$ to engage with one or other of a series of notches or stops $B'$ on the said track and a pawl or toggle-arm $C^3$, adapted to bear against one or other of a series of shoulders $B^2$ on the track for the purpose of moving the said horned lever C into engagement with the corresponding notch or stop $B'$, as in the apparatus described in the said former specification.

D is the lifting-rope. In the arrangement shown in Figs. 1 to 3 the lifting-rope D is passed over a pulley E, turning on a pin fixed in the frame of the traveler, and is then rove through a fall-block $f$ and attached at its extremity to the traveler-frame A. The pulley E instead of being mounted upon the pivot-pin of the load-suspender, as heretofore, is mounted upon a separate pin fixed at a suitable distance therefrom. The load-suspender $e$ in this arrangement consists of two pivoted hooks constructed and operating as hereinafter described.

The lever C is coupled to the load-suspender $e$ by means of certain levers and links comprised in a system of which the said lever forms a part and which in the arrangement shown in Figs. 1, 2, and 3 consists of the lever C, pivoted to the frame at $C'$, a second lever $b^5$, pivoted to the frame at $b^6$, a link $a$, coupling the ends of these two levers by means of the pins $a'$ and $b^4$, a third lever $b'$, pivoted to the frame at $b^2$, a second link $b$, coupling the levers $b'$ and $b^5$ by means of the pins $b^3$ and $b^4$, a third link $c$, suspended from the lever $b'$ by means of the pin $b^3$, and a fourth link $d$, attached to the link $c$ and to the suspender $e$ by means of universal joints at $d'$ and $e'$. Of this system of levers and links the parts which are essential to the interaction for alternately locking and unlocking the traveler and the load-suspender are the levers C and $b^5$ and the link $a$. Each of these levers in turn forms a locking toggle-joint with the link $a$. An abutment or stop $g$ in the frame A restrains the said toggle-joints alternately when slightly flexed in the direction requisite to make the locking more secure. When either toggle-joint is thus held, the other is necessarily flexed in the opposite direction to an angle of approximately ninety degrees and securely held in that position by the slightly-flexed toggle-joint. In one of these rigid positions (shown in Fig. 1) the load-suspender sustains the load. In the other (shown in Fig. 3) the traveler is locked to the track. The lever $b'$ and links $b\ c\ d$ connect the suspender $e$ to this interlocking system, so that the vertical motion of the suspender will impart the required movement to the lever $b^5$. The lever $b'$ and link $b$ together form a third toggle-joint, so arranged that a considerable upward movement of the pin $b^3$ is necessary to draw the joint-pin $b^4$ away from the stop $g$ far enough to liberate the lever C.

The two hooks $e$, forming the load-suspender, are pivoted upon a common pivot-pin $e'$ and are adapted to engage with the projections or blocks $f'$ on the frame $f$ of the fall-block for the purpose of sustaining the load when raised. The pivot-pins $d'\ e'$ extend, respectively, through vertical slots $A'\ h'$ in the frame A and in a bell-mouthed guide-frame $h$, suspended from the said frame by hinge-joints $h^2$. These hinge-joints, together with the universal joints connecting the links $c$ and $d$ and the hooks $e$, permit lateral swinging of the said guide-frame $h$, and thus facilitate the entrance of the fall-block into the said frame and prevent straining of the traveler by lateral swinging of the load. The guide-frame $h$ is formed with open ended slots $h^4$ at its lower part, into which the load-sustaining blocks $f'$ of the fall-block will enter when the load is raised. Pins $h^3$ are fixed in the guide-frame $h$ and extend through curved slots $e^2$ in the hooks $e$, so that when the said hooks are forced upward by the blocks $f'$ they will approach each other and engage with the said blocks, as shown in Figs. 1 and 2, and when they are lowered they will move away from each other and be disengaged from the said blocks $f'$, as shown in Fig. 3.

If desired, both hooks $e$ may be arranged to approach and engage with the load-sustaining blocks $f'$ from the same side thereof instead of from opposite sides, as shown, for instance, in Fig. 7.

For keeping the pawl $C^3$ in its proper position and returning it to this position when necessary we sometimes attach to the lever C a bell-crank lever $k'\ k$, the arm $k$ of which carries a roller $k^2$, which is held by a spring $k^3$ in engagement with a cam-surface formed on the tailpiece of the pawl $C^3$, the said spring being secured at one end to the lever C and at the other end to the arm $k'$ of the said bell-crank lever. The said cam-surface is so shaped that when the lever C has been rotated by the engagement of the pawl $C^3$ with any shoulder $B^2$, so as to bring the horn or projection $C^2$ into engagement with the corresponding stop $B'$ on the track, the roller $k^2$ will under the action of the spring $k^3$ move the pawl $C^3$ into the position shown in Fig. 3, and, entering the depression $k^4$ in the said cam-surface, will hold the said pawl in this position until, on the traveler passing a stop $B'$ while moving toward the left, the said pawl is turned into the position shown in Fig. 1 ready to engage the corresponding shoulder $B^2$ on the reversal of the direction of motion. The pawl can rotate sufficiently beyond the above-mentioned limits to allow the same to pass the stops so long as the motion is in one direction only.

When the load is sustained and the traveler free to travel along the track, the parts are in the positions shown in Fig. 1. The toggle-joint formed by the lever C and the link $a$ is slightly flexed toward and rests against the stop $g$, and that formed by the lever $b^5$ and the link $a$ is thereby rigidly held flexed in the opposite direction, so that no force applied to its center joint $b^4$ through the load-suspender $e$ can disturb the position of the system, the pin $b^4$ being under these conditions a fixed point. Similarly the toggle-joint formed by the lever $b'$ and link $b$ is flexed upward, and since the pins $b^2$ and $b^4$ are both for the time being fixed points no force applied downwardly to the joint-pin $b^3$ can disturb the position of any of the parts, and the pin $b^3$ is therefore under these conditions a fixed point. The load-suspender $e$ is in its highest position, and its hooks are held inward under the projections $f'$ on the fall-block frame by the pins $h^3$ in the slots $e^2$. As the suspender $e$ is coupled to the pin $b^3$ by means of the links $d\ c$ and as the pin $b^3$ cannot descend and allow the hooks to be disengaged, the load is securely sustained. When the traveler is locked to the track and the load is free to be lifted or lowered, the parts are in the positions shown in Fig. 3. The toggle-joint formed by the lever $b^5$ and link $a$ is slightly flexed toward and rests against the stop $g$, and that formed by the lever C and link $a$ is thereby rigidly held flexed in the opposite direction, so that no force tending to turn the lever C about its pivot can disturb the position of the system. The pin $a'$ is under these conditions a fixed point. As the horn $C^2$ is engaged in the notch $B'$ of the track and the pin $a'$ is for the time being a fixed point, no force tending to move the traveler in either direction can disturb the position of the system. The traveler is therefore securely held in position on the track, the pin $b^3$ is in its lowermost position, and the toggle-joint $b\ b'$ is straight or approximately so. The suspender $e$ is also in its lowermost position and withdrawn from beneath the projections $f'$ on the fall-block frame by the action of the pins $h^3$ in the slots $e^2$, and the load is therefore free to be lowered.

In the lifting of a load when the load-sustaining blocks $f'$ on the fall-block $f$ enter the slots $h^4$ in the guide-frame $h$ they come against the shoulders $e^3$ of the hooks $e$, and in the continued upward movement of the fall-block the said blocks $f'$ raise the said hooks, thereby moving upward the middle joint-pin $b^3$ of the toggle-joint $b\ b'$, drawing over the pin $b^4$ and allowing the lever C to disengage itself from the track, and at the same time causing the said hooks $e$ to be moved beneath the said blocks $f'$ by means of the pins $h^3$ extending through the curved slots $e^2$. The lever C when disengaged from the track is forced against the stop $g$, thus completing the locking of the load-suspender, so that the traveler can be moved along the track without lowering the load.

The locking of the traveler to the track and the simultaneously releasing or unlocking of the load-suspender are effected as follows: After the traveler has been hauled up the track to the left past any stop or notch $B'$, so that the pawl $C^3$ has been thereby turned to point to the right, the motion of the traveler is reversed by paying out the lifting-rope until the pawl $C^3$ engages with the corresponding shoulder $B^2$ on the track, as shown in Fig. 1. Then as the traveler continues to move in the direction of the arrow the said pawl $C^3$ causes the lever C to turn about its pivot until the horn $C^2$ partly enters the notch $B'$ on the track and until the toggle-joint $C\ a$ has been flexed past the dead-center in a direction away from the stop $g$. The pin $b^3$ now descends by the action of the load, straightening the toggle-joint $b\ b'$ and forcing the center of the toggle-joint $a\ b^5$ against the stop $g$. In doing so it forcibly completes the turning of the lever C about its pivot until the horn $C^2$ has fully entered the notch $B'$ and locked the traveler securely to the track against motion in either direction. At the same time the hooks $e$ will descend through a short distance with the fall-block and be moved apart by the pin $h^3$ in the guide-frame $h$, so as to release the fall-block, as shown in Fig. 3, and thus permit the lowering of the load.

It will be seen that by the above-described arrangement of the levers and links accidental displacement of the parts by jarring or concussion will be effectually prevented, and in the turning of the horned lever into engagement with the track there will be but slight resistance to its movement due to the weight of the load.

To adapt the apparatus for different inclinations of the overhead track without the aid of the devices heretofore employed for adjusting the parts to suit such different inclinations, we suspend the guide-frame or bell, which facilitates the entrance of the load-sustaining ball or block into the load-suspender from the traveler-frame by means of a transverse pivot-pin or pivot-pins fixed in the said frame or in a short frame hinged thereto, so as to permit longitudinal swinging of the said guide-frame or bell, or instead of this transverse pivot-pin we can use for this purpose a universal joint which will permit swinging of the said guide-frame or bell in any direction. In this case we can dispense with the said hinged frame.

In Figs. 1 to 4 the guide-frame or bell $p$ is pivoted at $p'$ to a short frame $h$, connected with the traveler-frame A by hinge-joints $h^2$, and the slots $h'$, in which works the pivot-pin $e'$ of the load-suspender $e$, are formed in the said guide-frame or bell $p$, the pins $h^3$, that extend into the slots $e^2$, being also fixed therein.

Figs. 5 and 6 show a single-purchase traveler in which the axle E' of the pulley E, over which the lifting-rope D passes, is fixed in the frame $h$, depending from the traveler-frame A, and the guide-frame or bell $p$ and load-suspender $e$ are pivoted at $p'$ to links $n$, coupled to the universal joint $e'$ at the lower end of the links $d$, the pivot-pins $p'$ being coupled by guide-links $o$ to a pin $o'$, fixed in the frame $h$, so that the pin $p'$, with all the parts attached to it, will rise and fall with the pin $e'$. The pins $h^3$ are in this case fixed in links $q$, pivoted at $q'$ to the frame $h$. When the ball or block $f'$ on the lifting-rope D enters the bell $p$, it lifts the said bell and the hooks $e$. As the pin $h^3$ cannot rise, the hooks $e$ are drawn in under the block $f'$, as shown, and sustain the load. The mechanism from $e'$ upward is the same as in the other figures hereinbefore referred to and works in the same way. Lateral swinging of the load is permitted by the hinges $h^2$, as before, and longitudinal swinging by the bell $p$ and hooks $e$ being free to swing about the pivots $p'$. It is evident that with this arrangement there is no necessity for altering or adjusting the parts to suit different inclinations of the track, the load-sustaining blocks $f'$ when the load is raised being in the same position relatively to the load-suspender $e$ whatever may be the inclination of the track. In cases where the track has a fixed or unvarying inclination we simplify the construction of the apparatus by rigidly securing the said guide-frames or other suitable guides for the load-sustaining ball or block to the frame of the traveler.

In Figs. 7, 8, and 9 we have shown modifications of our invention wherein our system of levers and links is applied to a single-purchase traveler. For this purpose three parts of the system of levers and links—the two levers C and $b^5$ and the link $a$—may be retained in the same relative positions and perform the same functions as in the case of the double-purchase traveler shown in Figs. 1, 2, and 3.

In the arrangement shown in Figs. 7 and 8 the lever $b^5$ is connected by the link $c$ with a lever $d$, pivoted at $d^2$ to the frame of the traveler and made with a downwardly-extending arm $d^3$, formed with an open slot or gab $d^4$ to engage the pin or stud $e^4$ on the load-suspender $e$. The suspender $e$ and the pulley E, over which the lifting-rope D passes, are both pivoted at $e'$ to the lower frame $h$, which is hinged at $h^2$ to the upper frame A, so as to allow the load to swing laterally without strain. The suspender in this instance is in the form of a double-pointed or split hook for engaging the ball or block $f'$ on the lifting-rope and is provided with a long split arm or race, through which the lifting-rope passes and to the free end of which is pivoted at $e^5$ a safety-pawl $e^7$, engaging the teeth of a quadrant F, fixed to the swinging frame $h$ to guard against accidental lifting of the suspender by the rope D. The pawl $e^7$ is provided with a long double arm $e^6$, by means of which the ball or block $f'$ before raising the suspender disengages the said pawl from the quadrant. The upper end of the quadrant F carries a leather pad $F^2$ to act as a stop for the upper arm of the suspender $e$. A check-plate $j$ is pivoted to the arm $d^3$ and is coupled by a link $j'$ to the frame A, so that when the load is being lifted or lowered the said check-plate $j$ is prevented by the pin $e^4$ from falling, and therefore acts as an extra security to the locking arrangement in the event of any violent shock to the traveler and forms a path for the reentrance of the pin $e^4$ into the gab $d^4$. The load-sustaining ball or block $f'$ is made with a double eye $f^4$ at the lower end of its hollow stem, so that when the lifting-rope has been rove through the said ball or block the thimble, which is spliced into the lower end of the rope, will readily enter the space between the two sides of the said double eye, and the bolt for connecting the shackle or hook to the lifting-rope can then be passed through the double eye and thimble. By this means we greatly facilitate the operation of attaching the said ball or block to the lifting-rope. When the load is sustained and the traveler free to travel along the track, the parts are in the position shown in Fig. 7, and the lever $b^5$ is rigidly held in the position shown by the toggle-joint C $a$. The suspender is held in its highest position by the pin $e^4$ in the gab $d^4$ of the lever $d$ $d^3$, and the ball or block $f'$ on the lifting-rope being in the hook of the suspender $e$ the load is securely sustained. When the traveler is locked to the track and the load is free to be lifted or lowered, the parts are in the positions shown in Fig. 8, and the lever C is rigidly held engaged in the stop on the track by the toggle-joint $b^5$ $a$, and the traveler thus securely locked against motion in either direction. The pin $e^4$ is then out of the gab $d^4$, and the suspender $e$ is in its lowermost position, resting on the stop $F^2$, and prevented from rising by the pawl $e^7$, and the ball or block $f'$ on the lifting-rope being no longer held by the hook the load is free to be lowered.

In the arrangement shown in Fig. 9 the lever $b^5$ is formed with an arm $d^3$, having a gab $d^4$ to engage with the pin $e^4$ of the load-suspender. When the load-suspender is raised by the ball or block $f'$, the pin $e^4$ turns the lever $b^5$ about its pivot and the system of levers and links acts as in the case of the double-purchase traveler hereinbefore described, thereby locking the suspender and sustaining the load, leaving the traveler free to be moved in either direction on the track. The locking of the traveler to the track and freeing of the load are effected in the same manner as that above described for the double-purchase traveler. The pin $e^4$ of the suspender in escaping from the gab in the lever $b^5$ rotates the latter forcibly until it rests against the stop $g$, thus completing the locking of the traveler to the track.

By employing a system of levers and links in the manner above set forth instead of slotted cams, as heretofore, for coupling the load-suspender to the device for fastening the traveler to the track we not only simplify and improve the construction of the apparatus, but greatly diminish the friction and wear of the moving parts. In Figs. 10 and 11 we have shown a modification of our invention, in which the load-suspender $e$ instead of being connected through the system of levers and links above described with the horned lever or cam C for locking the traveler to the track is coupled by means of links $d\ c$ to a slotted lever or cam G, which is connected by a sliding pin I to the slotted lever or cam C, that locks the traveler to the track. Each of the slots $C^4$ $G'$ in the levers or cams C G consists of a spiral portion and a radial portion, and are connected by a pin I, arranged to slide backward and forward in slots $A^7$ in the side plates of the traveler-frame A, as described in the said former specification. When the lever C turns about its pivot to engage the stop on the track, the pin I is forced to the right by the action of the spiral slot $C^4$ and enters the spiral slot $G'$ in the lever G. The lever G then falls with the load on the suspender, and its spiral slot $G'$ drags the pin I farther to the right and into the radial part of the slot $C^4$ in the lever C, which lever is thereby locked to the track, as shown, Fig. 11. When on lifting a load the suspender $e$ raises the lever G, the reverse action takes place and the parts return to the position shown in Fig. 10. All the other parts corresponding with those shown in Figs. 1 and 3 remain as therein shown and operate as hereinbefore described.

It is evident that we can somewhat further modify the construction of the various forms of our improved apparatus without departing from the nature of our said invention.

What we claim is—

1. In combination, a track, a traveler-frame adapted to travel on said track, a double toggle-joint on said frame, a detent operated by said toggle and adapted to hold said frame fixed relatively to said track, means to lock one part of said toggle when the other part is flexed and to thereby hold said detent in a fixed position.

2. In combination, a traveler-frame adapted to travel on an overhead track, a double toggle-joint on said frame, a detent operated by said toggle and adapted to hold said frame fixed relatively to said track, a load-suspender, means to connect said load-suspender with said toggle, and means to alternately lock either part of said toggle when the other part is flexed and to thereby alternately hold said detent in said fixed position, and retain said load-suspender in its raised position while said detent is out of engagement with said track.

3. In combination, a track, a traveler-frame, adapted to travel on said track, a double toggle-joint on said frame embracing three pivoted levers, a detent operated by said toggle and adapted to hold said frame fixed relatively to said track, means to lock one part of said toggle when the other part is flexed and to thereby hold said detent in a fixed position and means for supporting a weight adapted to vary one of the parts of said toggle to release said detent from its fixed position.

4. The combination, with the traveler-frame and the double locking toggle-joint, of a third toggle-joint coupled at one end to the said traveler-frame and at the other end to one of the joint-pins of the said double toggle-joint, substantially as, and for the purposes, hereinbefore described.

5. In an apparatus of the kind or class hereinbefore referred to, the combination, with the traveler-frame, of a horned lever pivoted to said traveler-frame, a fall-block through which the lifting-rope of the traveler is rove and which is provided with lateral projections forming a load-sustaining block, and a load-suspender connected with said horned lever and adapted to engage with said load-sustaining block, for the purposes above specified.

6. In an apparatus of the kind or class hereinbefore referred to, the combination, of a load-sustaining ball or block movable up and down with the load, a load-suspender adapted to engage with said load-sustaining ball or block, and a guide-frame or bell for facilitating the entrance of said load-sustaining ball or block into said load-suspender and which is free to swing in any direction, for the purposes above specified.

7. The combination of the traveler-frame, a locking device attached thereto comprising a double toggle, a load-sustaining ball or block movable up and down with the load, load-suspending hooks coupled to said locking devices and movable up and down relatively to said traveler-frame, and means for moving said hooks into and out of engagement with said load-sustaining ball or block as they rise and fall, substantially as, and for the purposes, hereinbefore described.

In testimony whereof we have hereunto set our hands in presence of two subscribing witnesses.

JOSEPH TEMPERLEY.
JOHN RIDLEY TEMPERLEY.

Witnesses:
FRANCIS W. FRIGOUT,
A. D. JAMESON.